United States Patent

[11] 3,624,209

| [72] | Inventors | Edmund S. Granatek;<br>Alphonse P. Granatek, both of<br>Baldwinsville, N.Y. |
|------|-----------|------------------------------------------------------------------------------|
| [21] | Appl. No. | 605,231 |
| [22] | Filed | Dec. 28, 1966 |
| [45] | Patented | Nov. 30, 1971 |
| [73] | Assignee | Bristol-Myers Company<br>New York, N.Y. |

[54] COMPOSITION FOR TREATMENT OF GASTRO-INTESTINAL DISORDERS
7 Claims, No Drawings

[52] U.S. Cl. .................................................... 424/79,
424/157, 424/158, 424/180
[51] Int. Cl. ......................................................... A61k 27/00
[50] Field of Search............................................ 167/55 A,
72 B, 65; 424/180, 157, 158, 79

[56] References Cited
UNITED STATES PATENTS

| 2,554,072 | 5/1951 | Sullivan et al. ................ | 424/79 |
| 2,581,035 | 1/1952 | Martin et al. ................. | 424/79 |
| 3,002,823 | 10/1961 | Flodin et al. .................. | 23/293 |
| 3,042,667 | 7/1962 | Flodin et al. .................. | 260/209 |
| 3,107,203 | 10/1963 | Baumgarten et al. .......... | 195/66 |
| 3,364,111 | 1/1968 | Morii et al. ................... | 167/55 |

*Primary Examiner*—Albert T. Meyers
*Assistant Examiner*—Daren M. Stephens
*Attorneys*—Curtis W. Carlton, Richard H. Brink, Robert B. Simonton and Herbert W. Taylor, Jr.

ABSTRACT: A pharmaceutical composition useful for the treatment of gastro-intestinal disorders comprising a diethylaminoethyl cross-linked dextran anion exchanger and a pharmaceutical carrier or another therapeutic agent and a method of treating gastro-intestinal disorders in mammals by the oral administration of such a composition.

COMPOSITION FOR TREATMENT OF GASTRO-INTESTINAL DISORDERS

It is known that pepsin contributes substantially to ulcer formation in the gastro-intestinal tract of mammals. Therefore, an important part of ulcer therapy is to reduce the amount of pepsin in the stomach. Heretofore only a limited number of pepsin inhibitors were known. Therefore, an object of the present invention is to provide a pharmaceutical composition useful for the treatment of ulcers of the gastro-intestinal tract. Another object of this invention is to provide a method of treating ulcers of the gastro-intestinal tract in mammals.

These and other objects which will become apparent as this specification proceeds are accomplished by the provision according to the present invention of a pharmaceutical composition comprising a diethylaminoethyl cross-linked dextran anion exhanger and a pharmaceutical carrier.

The diethylaminoethyl cross-linked dextran anion exchanger used in the compositions of this invention is marketed by Pharmacia Uppsula, Sweden, under the trade name DEAE-Sephadex. The anion exchanger is a weakly basic anion exchanger and is the diethylaminoethyl derivative of a polymer produced from dextran by cross-linking the linear polysaccharide chains to a three-dimensional network, which acts as a molecular sieve. The polymer is also marketed by Pharmacia Uppsula, Sweden, under the trade name Sephadex. In the diethylaminoethyl derivative, the diethylaminoethyl groups are attached at random by ether linkages to the glucose residues constituting the polysaccharide chains. The diethylaminoethyl cross-linked dextran anion exchanger employed in the compositions of this invention is fully described by B. Spross et al., *Acta Pharmaceutica Suecica* Vol. 2, No. 1, p. 1 (Feb. 1965).

Quite unexpectedly, it was discovered that diethylaminoethyl cross-linked dextran anion exchanger has antipepsin activity. The anion exchanger in effect neutralizes the effect of pepsin, making it useful for the treatment of ulcers in mammals, when administered in an effective amount.

The compositions of this invention comprise not more than about 200 mg./kg. per dosage unit and preferably from about 1 to about 200 mg./kg. of diethylaminoethyl cross-linked dextran anion exchanger together with a suitable carrier. The carrier may be either a solid or liquid and the compositions can be in the form of tablets, capsules, powders, granules or suspensions. The compositions can contain suitable preservatives, coloring and flavoring agents. Some examples of the carriers which can be used in the preparation of the compositions of this invention are gelatin capsules, sugars, cellulose derivatives such as sodium carboxy-methylcellulose, gelatin, talc, magnesium stearate, vegetable oil, such as peanut oil, etc., liquid petroleum, glycerin, sorbitol, ethanol, agar and water. The carrier may serve as a binder and the composition may be tabletted. If the carrier is a gelatin capsule, the diethylaminoethyl cross-linked dextran anion exchanger may be encapsulated into the gelatin capsule by conventional means. If a liquid carrier is used, the composition may be in the form of a suspension.

The compositions of the present invention may also contain other therapeutic agents, e.g., antacids, antispasmodics, anticholinergics and the like. Representative of the antacids are aluminum hydroxide, magnesium hydroxide, aluminum glycinate, calcium carbonate, complexes as described in U.S. Pat. No. 3,200,136 and the like.

Administration of the compositions of this invention to mammals orally in an effective amount is a useful method of treating gastro-intestinal ulcers.

The following examples are intended to illustrate the invention claimed herein without unduly restricting it.

EXAMPLE 1

This example demonstrates the antipepsin activity of the diethylaminoethyl cross-linked anion exchanger. The following experiments were carried out.

1. Five grams of gelatin was dissolved in 50 ml. of water, held at 37° C. for 1 hour and then allowed to stand overnight at ambient temperature. Result: The system set up to a stiff gel.
2. The above (1), repeated with 1 gram of DEAE-Sephadex A-25 added. Result: The system set up to a stiff gel.
3. The above, (1), was repeated with 1 gram of pepsin added. Result: The system remained fluid with no gel formation.
4. The above, (1), was repeated with 1 gram of pepsin plus 1 gram of DEAE-Sephadex A-25 added. Result: The system set up to a stiff gel.

From a comparison of the results of the foregoing experiments, it can be concluded that the diethylaminoethyl cross-linked anion exchanger inhibits peptic activity.

EXAMPLE 2

Two hundred grams of finely powdered DEAE-Sephadex A-25 are mixed with 200 grams of dried starch. The mixture is tested according to the procedure described in example 1 and is found to exhibit antipeptic activity.

EXAMPLE 3

Two hundred grams of finely powdered DEAE-Sephadex A-25 are mixed with 120 grams dried finely powdered aluminum hydroxide and 100 grams of dried starch. The mixture is tested according to the procedure described in example 1 and is found to exhibit antipeptic activity.

EXAMPLE 4

| Ingredients | Amounts per tablet, mg. |
|---|---|
| DEAE-Sephadex A-25 | 50.0 |
| Lactose, powdered | 125.0 |
| Sucrose, powdered | 125.0 |
| Talc | 15.0 |
| Magnesium stearate | 2.5 |

The DEAE-Sephadex, lactose and sucrose are mixed and screened through a 60-mesh U.S. standard screen. The screened mixture is then granulated with an alcoholic ethyl cellulose solution and the wetted mass is screened through an 8-mesh U.S. standard screen. The granules are dried and passed through a 12-mesh screen. These granules are then mixed with the talc, magnesium stearate, peppermint and spearmint and compressed into tablets.

Two or more tablets are administered once a day.

EXAMPLE 5

Antacid Suspension

| Formula: | Per liter |
|---|---|
| DEAE-Sephadex A-25 | 100.000 gms. |
| Methylparaben U.S.P. | 1.800 gms. |
| Propylparaben U.S.P. | 0.200 gm. |
| Sodium Hydroxide | 0.300 gm. |
| Saccharin Sodium U.S.P. | 0.166 gm. |
| Sodium Cyclamate N.F. | 1.666 gms. |
| Aluminum Hydroxide Conc. Wet Gel, Sterile | 261.400 gms. |
| Magnesium Hydroxide Paste | 131.150 gms. |
| Dimethylpolysiloxane Mixture, Sterile Medical Fluid 360—Dow Corning) 4000 g.—silicone dioxide fine powder 2500 g. mixture | 6.500 gms. |
| Magnesium Gluconate | 10.000 gms. |
| Peppermint Oil U.S.P. | 0.100 ml. |
| Purified Water U.S.P. (filtered) | q.s. to 1 liter |

Manufacturing Instructions

1. Assemble all equipment to be used in the production of the product. Clean and sterilize the equipment. Include all hoses, filters, scoops, etc., as well as the tanks and larger pieces of equipment. The manufacturing area should be swabbed with 5-percent phenol solution. All personnel in the area should wear sterile caps, gowns, masks and gloves.
2. To a clean (not sterile) tank, add 60 percent of the final bath volume of Purified Water U.S.P.
3. With agitation add the sodium hydroxide, methylparaben and propylparaben to the batching tank. Mix for 15 minutes.
4. With continued agitation add the saccharin sodium, sodium cyclamate and magnesium gluconate. Continue agitation for 20 minutes or until a clear solution results.
5. Pass the solution from step 4 through a sterile Ertel filter equipped with EO pads. Collect the filtrate in a sterile batching tank. Retain the sterile filter so that it may be used to prepare filtered purified water U.S.P. as called for in subsequent steps.
6. To the filtered solution from step 5, add the sterile dimethylpolysiloxane mixture, the aluminum hydroxide gel, DEAE-Sephadex and the magnesium hydroxide paste with rapid agitation. Containers may be rinsed with filtered purified water U.S.P. equivalent to 4 percent of the total batch volume.

Use sterile utensils for the transfer. Maintain agitation until a smooth, uniform dispersion has been obtained.
7. Pass the suspension through a sterile 6-inch or 8-inch Premier mill. Adjust the tank p.s.i. with air pressure (sterile) or with nitrogen to maintain 5 p.s.i. on the mill head. Adjust the clearance of the rotor to 0.010 on the 8-inch mill or 0.006 on the 6-inch mill. Temperature of the milled suspension should not exceed 86° F. (30° C.). Begin cooling of the sterile receiving tank as the milling starts.
8. Rinse the batching tank with a volume of filtered purified water U.S.P. equal to 8 percent of the final batch volume and add to the batch.
9. Add the oil of peppermint to the batch and agitate for 15 minutes.
10. Agitate the batch under vacuum for 20 minutes. Release with nitrogen or filtered air.
11. Check final volume and, if necessary, add sufficient filtered purified water U.S.P. to the batch to bring it up to proper volume.
12. Agitate under vacuum for 20 minutes then release with nitrogen or filtered air and hold for filling. Take final samples.
13. Transfer product to filling line using nitrogen or filtered air. Pass the product through a 40-mesh screen on the way to the filling line. Before filling, the tank should be agitated for 30 minutes. Agitation should be continued throughout the filling operation. Do not agitate at high speed.

EXAMPLE 6

| Ingredients | Amounts per tablet, mg. |
| --- | --- |
| DEAE-Sephadex A-25 | 500.0 |
| Starch | 75.0 |
| Magnesium stearate | 2.5 |

The DEAE-Sephadex and half the amount of starch are mixed and screened through a 60-mesh U.S. standard screen. The screened mixture is then granulated with an alcoholic ethyl cellulose solution and the wetted mass screened through an 8-mesh U.S. standard screen. The granules are dried and passed through a 12-mesh screen. These granules are then mixed with the remaining starch and magnesium stearate and compressed into tablets.

One tablet is administered twice a day.

EXAMPLE 7

| Ingredients | Amounts |
| --- | --- |
| DEAE-Sephadex A-25 | 10.000 gm. |
| Sodium saccharin | 0.025 gm. |
| D-sorbitol | 2.000 gm. |
| Methylparaben | 0.125 gm. |
| Propylaparaben | 0.025 gm. |
| Sodium metabisulphite | 0.100 gm. |
| Oil of Peppermint | 0.010 gm. |
| Purified water, U.S.P., qs | 100.000 ml. |

The parabens are dissolved in 15 ml. of hot water and to this added the sorbitol, saccharin and sodium metabisulphite which had previously been dissolved in 20 ml. of water. The DEAE-Sephadex is added to the above solution and thoroughly mixed. The oil of peppermint is then added and the preparation is brought up to volume with purified water.

Two tablespoonsful are administered four times daily.

EXAMPLE 8

Aluminum Hydroxide-Magnesium Hydroxide Antacid Suspension

| Formula: | Per Liter |
| --- | --- |
| DEAE-Sephadex A-25 | 400.000 gms. |
| Methyl Paraben, U.S.P., micronized | 0.790 gm. |
| Propyl Paraben, U.S.P., micronized | 0.190 gm. |
| Sodium Saccharin, U.S.P. | 0.166 gm. |
| Sodium Sucaryl | 1.666 gms. |
| Aluminum Oxide as Aluminum Hydroxide Wet Gel, J. T. Baker Chemical Company, Type 150 | 26.14 gms. |
| Magnesium Hydroxide as Merck Hydro-magna, MM No. 1021/314 | 40.00 gms. |
| Magnesium Gluconate | 10.00 gms. |
| Carboxymethyl Cellulose | 1.25 gms. |
| Oil of Peppermint, U.S.P. | 0.10 ml. |
| Purified Water, U.S.P. qs | 1,000.00 ml. |

Manufacturing Instructions
1. To 400 ml. of purified water, U.S.P. add the methyl paraben, propyl paraben, sodium saccharin, sodium sucaryl and magnesium gluconate.
2. With mild agitation, heat to 70° C. and hold at this temperature until solution is obtained.
3. Cool to 25° C. using cooling water in the tank jacket and as to 400 ml. with purified water, U.S.P.
4. Pass the solution through a sterile Ertel filter equipped with EO pads and collect into a sterile batching tank.
5. Pass an additional quantity of purified water, U.S.P. through the filter sufficient to collect 300 ml. of filtrate and place in a sterile holding tank.
6. Swab the exterior of the drums containing the wet gels with 5 percent W/V phenol solution.
7. To the filtered solution in the batching tank (step 4), slowly add the DEAE-Sephadex aluminum hydroxide and magnesium hydroxide gels with rapid agitation. Use sterile utensils for this transfer. Maintain agitation until a smooth, uniform dispersion has been obtained.
8. Remove 200 ml. of the filtered water from the holding tank (step 5) and dissolve the carboxymethyl cellulose in it with rapid agitation in a sterile vessel.
9. With agitation, slowly add the carboxymethyl cellulose solution to the suspension from step 7. Up to 20 ml. of the filtered water left in the holding tank may be used for rinsing, continue to mix rapidly until uniformly dispersed.
10. Pass the suspension through a sterile Eppenbach micromill with the micrometer set at 2(0.002-inch clearance) and the Rheostat set at 100. Cooling water must be used in the jacket of the mill.

11. Deaerate using the "Spray Nozzle" process. Up to 60 ml. of the filtered water remaining in the holding tank (step 5) may be used for rinsing.
12. Add the oil of peppermint and sufficient filtered water from the holding tank (step 5) to bring the batch up to final volume.
13. Agitate at a moderate speed for 30 minutes being careful not to incorporate air into the suspension.

EXAMPLE 9

Chewable Antacid Tablet

| Formula: | Per Tablet |
| --- | --- |
| DEAE-Sephadex A-25 | 0.250 gm. |
| Aluminum Hydroxide, U.S.P., dried gel, medium powder, J. T. Baker Chemical Co. | 0.300 gm. |
| Magnesium Hydroxide, N.F., Marinco H, MM No. 1211/370, Whittaker, Clark, & Daniels, Inc. | 0.090 gm. |
| Mannitol, N.F., 200 mesh | 0.300 gm. |
| Urea, N.F., 60 mesh | 0.060 gm. |
| Sodium Sucaryl, 200 mesh | 0.020 gm. |
| Sodium Saccharin, U.S.P., 200 mesh | 0.002 gm. |
| Corn Starch, U.S.P. | 0.0133 gm. |
| Flavors | 0.013 gm. |
| Magnesium Stearate, U.S.P. | 0.0456 gm. |
| TABLET WEIGHT anhydrous basis | 1.0939 gms. |

Manufacturing Instructions for 1,000 Tablets

1. Prepare 266.0 grams of 5 percent (w/w) starch paste by heating 13.3 grams of corn starch dispersed in 252.7 ml. of purified water, U.S.P., to boiling. Sufficient agitation should be used during this step to avoid scorching. Remove heat and maintain agitation until cooled to 25° C. Add sufficient purified water, U.S.P., to bring the weight up to 266.0 grams and mix to obtain a homogenous paste.
2. Place the DEAE-Sephadex, aluminum hydroxide, magnesium hydroxide, mannitol, urea, sodium sucaryl and sodium saccharin in a pony pan and blend at slow speed for 15 minutes.
3. Pass the blend through a Fitzmill at high speed with impact forward using a MOO screen.
4. Return the milled material to the pony pan and continue mixing for one-half hour.
5. With agitation remaining at low speed, rapidly add all of the starch paste from step 1 and mix until a uniform dispersion is obtained. The mix appears dry at this point but usually contains enough moisture to form the granulation. If necessary, additional water may be added to facilitate the formation of the strands of granulation described in the next step.
6. Pass the mix through a Stokes oscillator, with funnel removed, using a 6-mesh stainless steel screen and collect directly on drying trays. If strands of granulation are not being formed, additional water must be added to the mix.
7. Spread the granulation evenly on the trays and dry in a Stokes oven at 38° C. until the moisture content is 4.5 to 5.5 percent.
8. Mill using a combination of screen, speed, and blade adjustment which will produce the greatest yield of 30- to 60-mesh granules.
9. Separate the granules retained on a 60-mesh screen, add 5.48 percent magnesium stearate and hold.
10. To the fines passing through a 60-mesh screen add 5.48 percent magnesium stearate and blend thoroughly.
11. Slug at a weight of 0.470 grams using one-half inch, flat punches to a hardness of 5 to 7 kg. Reduce the slugs to 30- to 60-mesh granules and repeat the process until not more than 15 percent nor less than 10 percent of fines passing through a 60-mesh screen remain.
12. Combine the lubricated granules from step 9 with the granules and fines from step 11. Add the flavors and blend thoroughly for 30 minutes.
13. Tablet using five-eighth inch, flat, beveled edge punches to a hardness of 11 kg. or one-half inch square, concave punches to a hardness of 9 to 10 kg. (Strong-Cobb-Arner Tester).

EXAMPLE 10

Chewable Tablets with Antiflatulant

| Formula: | Per Tablet |
| --- | --- |
| DEAE-Sephadex A-25 | 0.5000 gms. |
| Aluminum Hydroxide Gel, Dried, U.S.P. | 0.3120 gm. |
| Magnesium Hydroxide, N.F. | 0.0936 gm. |
| Mannitol, N.F. | 0.3014 gm. |
| Urea, N.F. | 0.0600 gm. |
| Sodium Cyclamate, N.F. | 0.0200 gm. |
| Sodium Saccharin, U.S.P. | 0.0020 gm. |
| Corn Starch, U.S.P. | 0.0160 gm. |
| Polyvinylpyrrolidone | 0.0080 gm. |
| Flavors | 0.0130 gm. |
| Magnesium Stearate, U.S.P. | 0.0340 gm. |
| Dimethylpolysiloxane | 0.0200 gm. |
| Silicone Dioxide (fine powder) | 0.0125 gm. |
| Total Weight | 1.3925 gms. |

Manufacturing Instructions

1. Dissolve the dimethylpolysiloxane in methylene chloride using 2 ml. of methylene chloride for each gram of medical fluid.
2. With agitation, add the solution from step 1 to the silicone dioxide in a pony pan. Mix until uniformly dispersed.
3. Dry until free of methylene chloride.
4. Pass the mannitol, urea and dried silicone dioxide from step 3 through a Fitzmill equipped with a 00-screen, impact forward, high speed.
5. Place the milled material from step 4 in a blender with the aluminum hydroxide, magnesium hydroxide, sodium cyclamate and sodium saccharin. Blend for 30 minutes.
6. a. With agitation, dissolve the PVP in about two-thirds of the purified water U.S.P. required to make the paste. (Amount of purified water U.S.P. for paste should be 20 ml. per gram of corn starch).
    b. Heat the PVP solution to boiling.
    c. Disperse the corn starch in the remaining one-third of the water.
    d. Add the starch-water dispersion to the hot PVP solution with mixing. Continue to mix and heat until a translucent gel results.
7. With agitation at low speed, add the starch paste to the powder blend in a pony pan. Mix well to form a uniform wet granulation. If necessary, this step may be carried out in two or more pan loads.
8. Spread the granulation evenly on trays, breaking up the large lumps by hand, and dry at 100° F. (38° C.) for 10 hours. NOTE: Moisture content of the dried granules *must* be from 4.5 to 5.5 percent. *Extreme caution must be taken not to overdry this granulation.*
9. Pass the dried granules through a Fitzmill equipped with a 2AA screen, knives forward, medium speed.
10. Take a representative sample of the milled granulation. Determine percent moisture of the granulation.
    a. If moisture is below 4.5 percent there is danger that the antacids may be inactivated. Have the granulation tested for antacid activity before preceding with the manufacture of the lot. (Adding back moisture will not reactivate the product).
    b. If moisture is above 5.5 percent return the granulation to the oven and dry so that the moisture is 4.5 to 5.5 percent.

11. Place the dried granulation in a blender, add the flavors and blend for 30 minutes.
12. Add the magnesium Stearate to the blend and mix for 10 minutes. 13. Compress at 1.3925 gram using ½-inch square, concave punches embossed B/L. Hardness should be 15–20 Kg. using a Strong-Cobb-Arner Hardness Tester, applying pressure to two opposite sides of the tablet.

Example 11

Antacid Chewable Soft Gelatin Capsules

| Formula: | Per Capsule |
| --- | --- |
| DEAE-Sephadex A–25 | 0.250 gm. |
| *Soluble Buffer Antacid, micropulverized | 0.425 gm. |
| Aluminum Hydroxide—Magnesium Carbonate, micropulverized Codried Gel, FMA-11 Powder, Reheis | 0.425 gm. |
| Magnesium Trisilicate Powder | 0.100 gm. |
| Soy Bean Oil Refined 0.480 gm. | mixture used |
| Lecithin, Soya 0.015 gm. | to q.s. |
| Sodium Lauryl Sulfate U.S.P. | 0.0075 gm. |
| Mannitol N.F., micropulverized | 0.100 gm. |
| Urea, micropulverized | 0.080 gm. |
| Sodium Cyclamate N.F., micropulverized | 0.0768 gm. |
| Sodium Saccharin N.F., | 0.00768 gm. |
| Peppermint Natural Flavor, Powder | 0.006 gm. |
| *Preparation of Soluble Buffer Antacid: | Per 120 ml. |
| Gluconic Acid, Technical 50% Grade | Sufficient Material to be equivalent to 38.416 grams of 100% Gluconic Acid |
| Aluminum Hydroxide | Sufficient material to be equivalent to 9.792 grams of Aluminum Oxide |
| Magnesium Hydroxide NF. Powder | 5.601 grams |

Manufacturing Instructions for Soluble Buffer Antacid
1. To a sterilized tank, add 16 liters of deionized water and the gluconic acid.
2. With agitation, heat the mixture to 80° C.
3. With continued agitation, slowly add the magnesium hydroxide. (Fast addition will result in frothing.)
4. With continued agitation, slowly add the aluminum hydroxide.
5. Maintain agitation and temperature at 90°–100° C. for 1 hour. At this point, the solution is light yellow in color and slightly hazy in appearance. Check pH. (Should be greater than 7.6)spray dry, evaporate to dryness or lyophilize.

Manufacturing Instructions for Antacid Chewable Soft Gelatin Capsules
1. With agitation in a suitable container dissolve the lecithin in the soy bean oil.
2. With agitation incorporate the sodium lauryl sulfate.
3. With agitation incorporate all the ingredients.
4. Pass the suspension through a premier mill.
5. Deaerate.
6. Fill into the smallest size capsules possible, using a soft gelatin encapsulating machine.

Example 12

Antacid Chewable Soft Gelatin Capsules

| Formula: | Per Capsule |
| --- | --- |
| DEAE-Sephadex A–25 | 0.40 gm. |
| Soluble Buffer Antacid micronized | 1.79 gms. |
| Soy Bean Oil Refined 0.480 gram | mixture used |
| Lecithin, Soya 0.015 gram | to q.s. |
| Sodium Lauryl Sulfate U.S.P. | 0.0075 gm. |
| Mannitol N.F., micropulverized | 0.100 gm. |
| Urea, micropulverized | 0.080 gm. |
| Sodium Cyclamate N.F., micropulverized | 0.768 gm. |
| Sodium Saccharin N.F. | 0.00768 gm. |
| Peppermint Natural Flavor, Powder | 0.006 gm. |

Manufacturing Instructions
1. With agitation in a suitable container dissolve the lecithin in the soy bean oil.
2. With agitation incorporate the sodium lauryl sulfate.
3. With agitation incorporate all the ingredients.
4. Pass the suspension through a premier mill.
5. Deaerate.
6. Fill into the smallest size capsules possible, using a soft gelatin encapsulating machine.

While this invention has been described in terms of its preferred embodiment, those skilled in the art will appreciate that modifications can be made.

What is claimed is:
1. A pharmaceutical composition for the treatment of gastro-intestinal disorders comprising a diethylaminoethyl cross-linked anion exchanger and an antacid selected from the group consisting of aluminum hydroxide, magnesium hydroxide, aluminum glycinate and calcium carbonate.
2. A pharmaceutical composition for treatment of gastro-intestinal disorders according to claim 1, wherein said antacid is aluminum hydroxide.
3. A pharmaceutical composition for treatment of gastro-intestinal disorders according to claim 1, wherein said antacid is magnesium hydroxide.
4. The pharmaceutical composition for treatment of gastro-intestinal disorders of claim 1 in unit dosage form for oral administration.
5. The pharmaceutical composition for treatment of gastro-intestinal disorders of claim 1 in the form of a dosage unit tablet.
6. The method of treating gastro-intestinal ulcers in mammals which comprises orally administering an effective amount of a composition comprising diethylaminoethyl cross-linked dextran anion exchanger and an antacid selected from the group consisting of aluminum hydroxide, magnesium hydroxide, aluminum glycinate and calcium carbonate.
7. The method of claim 6 wherein said antacid is aluminum hydroxide.

* * * * *